United States Patent
Watson

(10) Patent No.: US 6,612,419 B1
(45) Date of Patent: Sep. 2, 2003

(54) LOW-PROFILE TENSIONER FOR A CONVEYOR BELT SCRAPER

(75) Inventor: Gregory K. Watson, Salem, KY (US)

(73) Assignee: Arch Environmental Equipment, Inc., Paducah, KY (US)

( * ) Notice: Subject to any disclaimer, the term of this patent is extended or adjusted under 35 U.S.C. 154(b) by 0 days.

(21) Appl. No.: 10/057,355

(22) Filed: Jan. 24, 2002

(51) Int. Cl.⁷ .............................................. B65G 45/12
(52) U.S. Cl. ...................... 198/497; 198/499; 198/813
(58) Field of Search ................................ 198/499, 497, 198/813, 814, 815, 816

(56) References Cited

U.S. PATENT DOCUMENTS

| | | | | |
|---|---|---|---|---|
| 4,098,394 A | * | 7/1978 | Stahura .................... 198/499 |
| 4,533,036 A | | 8/1985 | Gordon | |
| 4,995,851 A | * | 2/1991 | Taylor et al. ............... 747/101 |
| 5,065,859 A | * | 11/1991 | Brumby .................... 198/499 |
| 5,201,402 A | * | 4/1993 | Mott ........................ 198/499 |
| 5,301,797 A | * | 4/1994 | Hollyfield, Jr. et al. ..... 198/499 |
| 5,378,202 A | * | 1/1995 | Swinderman ............... 474/92 |
| 5,727,670 A | * | 3/1998 | Johnson .................... 198/497 |
| 5,931,280 A | * | 8/1999 | Nissen ...................... 198/499 |
| 5,975,281 A | | 11/1999 | Yoshizako et al. | |
| 5,992,614 A | * | 11/1999 | Mott ........................ 198/499 |
| 6,003,657 A | * | 12/1999 | Mott ........................ 198/499 |
| 6,152,290 A | * | 11/2000 | Mott et al. ................ 198/499 |
| 6,283,274 B1 | * | 9/2001 | Dolan et al. ............... 198/499 |
| 6,296,105 B1 | | 10/2001 | Carnes | |
| 6,360,875 B1 | * | 3/2002 | Altemus, Jr. et al. ....... 198/499 |
| 6,374,990 B1 | * | 4/2002 | Swinderman ............... 198/497 |
| 6,374,991 B1 | * | 4/2002 | Swinderman ............... 198/499 |
| 6,401,911 B1 | * | 6/2002 | Swinderman ............... 198/499 |
| 6,439,373 B1 | * | 8/2002 | Swinderman ............... 198/499 |
| 6,443,294 B1 | * | 9/2002 | Brody et al. ............... 198/499 |

* cited by examiner

Primary Examiner—Christopher P. Ellis
Assistant Examiner—Rashmi Sharma
(74) Attorney, Agent, or Firm—Lloyd L. Zickert

(57) ABSTRACT

A low-profile tensioner for a conveyor belt scraper that utilizes an elastomeric collar having a force storing means in the form of a series of spokes, wherein the elastomeric collar is tensioned and then connected to the rotatable shaft of the conveyor belt scraper assembly to bias the scraper against the surface of the conveyor belt while providing adequate space around the tensioner to allow for the easy adjustment or maintenance of the tensioner.

16 Claims, 3 Drawing Sheets

LOW-PROFILE TENSIONER FOR A CONVEYOR BELT SCRAPER

This invention relates in general to a tensioner for a conveyor belt scraper assembly and, more particularly, to a low-profile tensioner that utilizes an elastomeric collar having a series of spokes, wherein the elastomeric collar is tensioned and then connected to the rotatable shaft of the conveyor belt scraper assembly to bias the scraper against the surface of the conveyor belt while providing adequate space around the tensioner to allow for the easy adjustment or maintenance of the tensioner.

BACKGROUND OF THE INVENTION

Transportation of materials or products to remote locations or along a production line, such as in the mining or manufacturing industries, is often accomplished through the use of conveyor belts. In use, employees or machines place the materials or products on the conveyor belt at one location and the conveyor belt carries those goods to another location for further processing or unloading. During the process, particles frequently accumulate on the conveyor belt surface. Without the removal of the particles, the conveyor belt may become inoperative. Thus, a conveyor belt scraper is often used to remove the particles from the conveyor belt surface. As the scrapers, which are often polyurethane, will wear down from continued use, it is important to ensure that the belt scraper remains in contact with the conveyor belt surface to remove the particles.

Heretofore, it has been known to use tensioning devices utilizing torsion tubes or mechanical springs to bias the conveyor belt scraper into engagement with the conveyor belt surface. For example, U.S. Pat. No. 4,533,036 teaches the use of an elastomeric torsion tube that may be twisted and then connected to a collar attached to the rotatable shaft. The torsion tube of this tensioner needs to be of a certain length to allow for the creation of a sufficient torsional force to continually bias the scraper blade against the conveyor belt surface. Thus, it was sometimes difficult to adjust or maintain the tensioner because of the limited clearance or space between the tensioner and a wall or structure located adjacent to the conveyor belt structure.

Problems also occurred with the use of mechanical springs as tensioners. In particular, as the environment in which conveyor belt scrapers are used is often wet, dirty and corrosive, problems arose due to the buildup of particles or dirt between the coils of the springs or because of the corrosion of the spring. Additionally, the limited travel of the springs commonly required subsequent adjustments to the tensioners to ensure that the belt scrapers engaged their respective conveyor belt surface.

Therefore, there is a need for a low-profile tensioner that avoids the above problems and allows for the adjustment or maintenance of the tensioner while insuring that the belt scraper remains in contact with the conveyor belt surface to effectively scrape the conveyor belt.

SUMMARY OF THE INVENTION

The tensioner of the present invention overcomes the above problems in providing a low-profile tensioner that allows for adequate space to adjust and maintain the tensioner, while maintaining the scraper blade in contact with the conveyor belt surface. The tensioner is used with a conveyor belt scraper assembly that includes a conveyor belt scraper attached to a rotatable shaft that extends transversely and in spaced relation to the surface of the conveyor belt. At one end, the rotatable shaft extends through a fixed member and the tensioner. The tensioner, which is attached to the fixed member through a rigid collar, includes an elastomeric collar that has a series of spokes connecting an inner ring to an outer ring. A sleeve, connected at its base to the inner ring, extends through the elastomeric collar and is sized to allow the rotatable shaft to pass through.

Once the tensioner is assembled over the rotatable shaft and connected to a fixed member, the rotatable shaft is rotated until the scraper blade engages the conveyor belt surface. A tensioner wrench or other tool then may be used to load the elastomeric collar so that a torsional force is applied to the scraper blade shaft. The collar includes an outer ring connected to the fixed member, an inner ring concentric to the outer ring and connected to a sleeve receiving the shaft, and spokes interconnecting the rings. With the scraper blade biased against the conveyor belt surface, a locking pin or other device is used to connect the sleeve and inner ring of the elastomeric collar to the rotatable shaft, thereby acting to bias the scraper blade against the conveyor belt surface.

It is therefore an object of the present invention to provide a new and improved tensioner for a conveyor belt scraper that is compact and of a low-profile to minimize the space required in a conveyor installation and facilitate the adjustment and maintenance of the tensioner.

A further object of the present invention is to provide a new and improved conveyor belt scraper tensioner that utilizes a collar made of an elastomeric material having excellent wear characteristics, thereby increasing the life of the tensioner.

It is still a further object of the present invention to provide a new and improved conveyor belt scraper tensioner that utilizes an elastomeric collar having spokes connecting an inner ring to an outer ring to provide a low-profile tensioner that maintains the scraper blade in biased contact with the conveyor belt surface.

A still further object of the present invention is to provide a new and improved conveyor belt scraper tensioner that utilizes an elastomeric material having excellent memory characteristics to ensure that the scraper blade remains engaged with the conveyor belt surface as the scraper blade wears down.

Other objects, features and advantages of the invention will be apparent from the following detailed disclosure, taken in conjunction with the accompanying sheets of drawings, wherein like reference numerals refer to like parts.

DETAILED DESCRIPTION OF THE INVENTION

Figure 1:
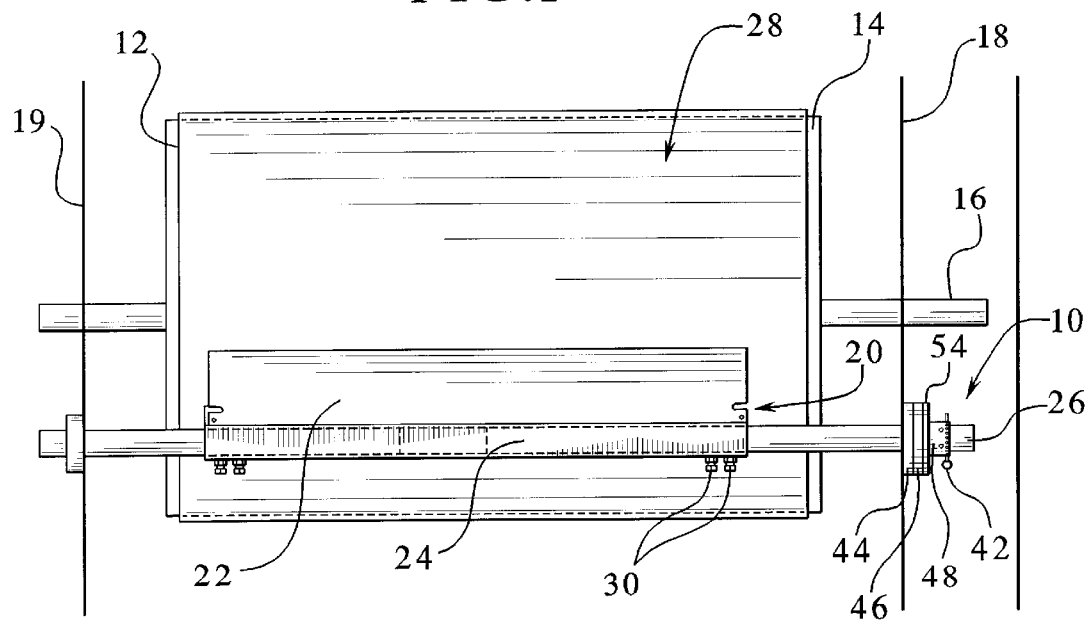
FIG. 1 is a vertical elevational view of the low-profile tensioner of the present invention attached to a conveyor belt scraper showing the clearance provided between the tensioner and an additional structure or fixed member to the right of the tensioner.
Figure 2:
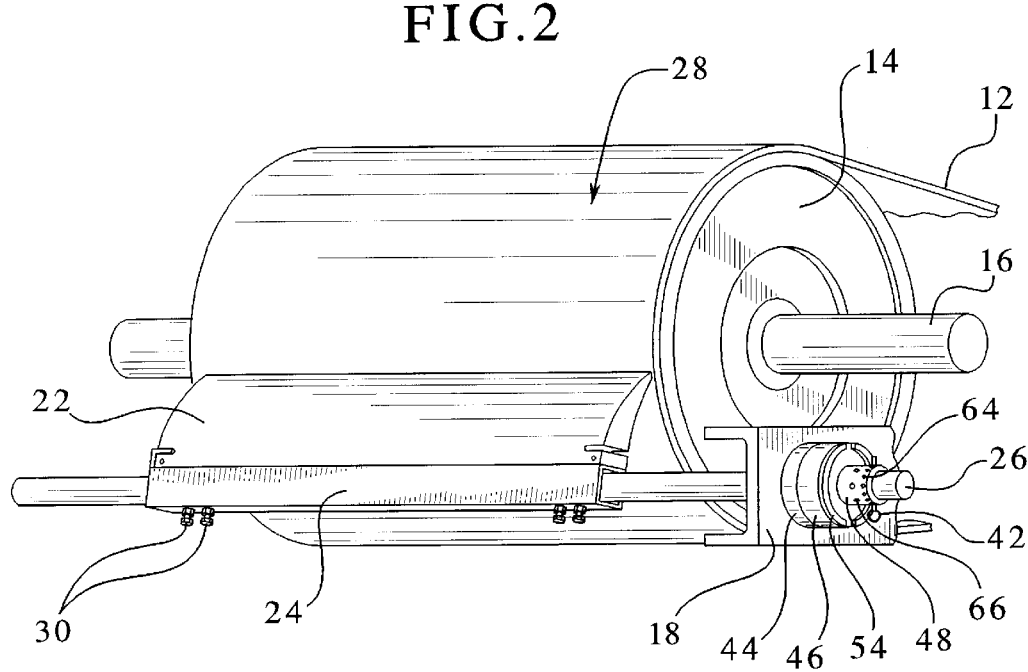
FIG. 2 is a perspective view of the conveyor belt scraper assembly of FIG. 1 showing the scraper blade rotated into engaged position with the conveyor belt.
Figure 3:
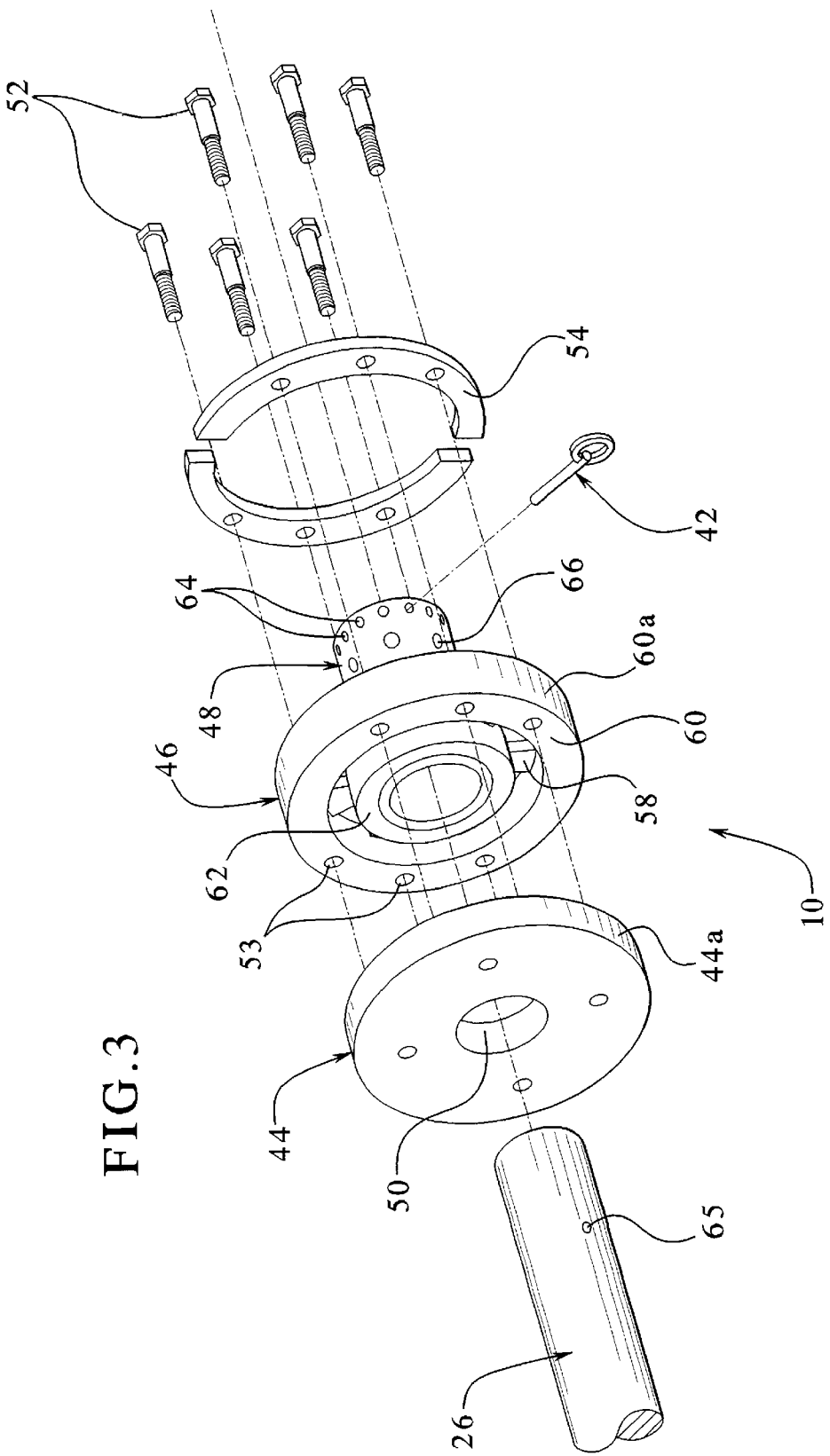
FIG. 3 is an exploded perspective view of the tensioner device and rotatable scraper blade shaft of FIG. 1 showing the locking pin insertable into one of the holes on the sleeve and through a locking hole on the rotatable shaft to connect the tensioner to the rotatable shaft and scraper blade.

Referring now to the drawings, and particularly to FIGS. 1 to 3, the improved tensioner of the present invention for a conveyor belt scraper, generally designated by the numeral 10, is illustrated in use with a conveyor belt scraper assembly 20. The conveyor includes a head roller 14 that is carried on a shaft 16 suitably supported in bearings mounted on fixed frame members 18 and 19. A suitable drive means (not shown) is provided to drive a conveyor belt 12 that is trained over the head roller 14. The scraper assembly 20 functions to remove unwanted particles and debris from the carrying surface of the conveyor belt 12.

The scraper assembly 20 includes at least one scraper blade 22 mounted on a shaft sleeve or housing 24. While a one-piece scraper blade, such as the urethane Saber Blade made by Arch Environmental Equipment, Inc. of Paducah, Ky., is shown in FIGS. 1 and 2, it is appreciated that this invention may be used with other one-piece scraper blades, multiple-piece scraper blades, or blades that are integral with a shaft sleeve. It is also appreciated that the scraper blade or blades may extend across all or part of the conveyor belt.

A rotatable shaft 26 extends through the shaft sleeve 24 in spaced relation to the surface 28 of the conveyor belt 12. A plurality of bolts 30, or other suitable fastening means, may be used to connect and lock the shaft sleeve 24 to the rotatable shaft 26. Although the rotatable shaft is shown in two sections as particularly seen in FIG. 1, which may facilitate assembly at the conveyor, it will be appreciated that a single shaft may be used. The rotatable shaft 26 is rotatably supported on the fixed frame member 19 at one end, and on the fixed frame member 18 and through the tensioner 10 at the other end. As more particularly described hereafter, the rotatable shaft 26 is locked to the tensioner 10 through the use of a locking pin 42.

As best shown in the exploded view of the tensioner in FIG. 3, the tensioner 10 includes a rigid collar 44 for attachment to a frame, an elastomeric collar 46 connected to the rigid collar and the frame and having a steel sleeve 48 bonded thereto, and the locking pin 42 for connecting the sleeve of the tensioner 10 and the elastomeric collar to the rotatable shaft 26. The rigid collar 44 is preferably made of steel, but may be made of any suitable rigid material, and is attached to the fixed frame member 18 by a plurality of bolts or other suitable fastening means. When attached to the fixed member 18, a central hole 50 in the rigid collar 44 aligns with the opening in the fixed member 18 through which the rotatable shaft 26 extends.

The elastomeric collar 46 includes an outer ring 60, an inner ring 62 concentric to the outer ring, and suitable force storing means interconnecting said rings. The force storing means is preferably in the form of a plurality of radially extending spokes 58 disposed intermediate to the side edges of the rings. While the force storing means is shown as spokes, it is appreciated it may be a solid annular member. The outer ring 60 is connected to the rigid collar 44 by a plurality of bolts 52 extending through holes 53 of the outer ring, thereby securing the elastomeric collar 46 through the rigid collar to the fixed member 18. Although the spokes 58 extend radially, they could extend non-radially if desired. Further, although the spokes are shown to be straight, they could be formed arcuately or otherwise if desired. The bolts 52 threadingly anchor in tapped holes formed in the rigid collar 44. It should be appreciated that the outer ring of the elastomeric collar may be directly connected to the frame member 18 if desired, thereby eliminating the need for the rigid collar.

Figure 4:
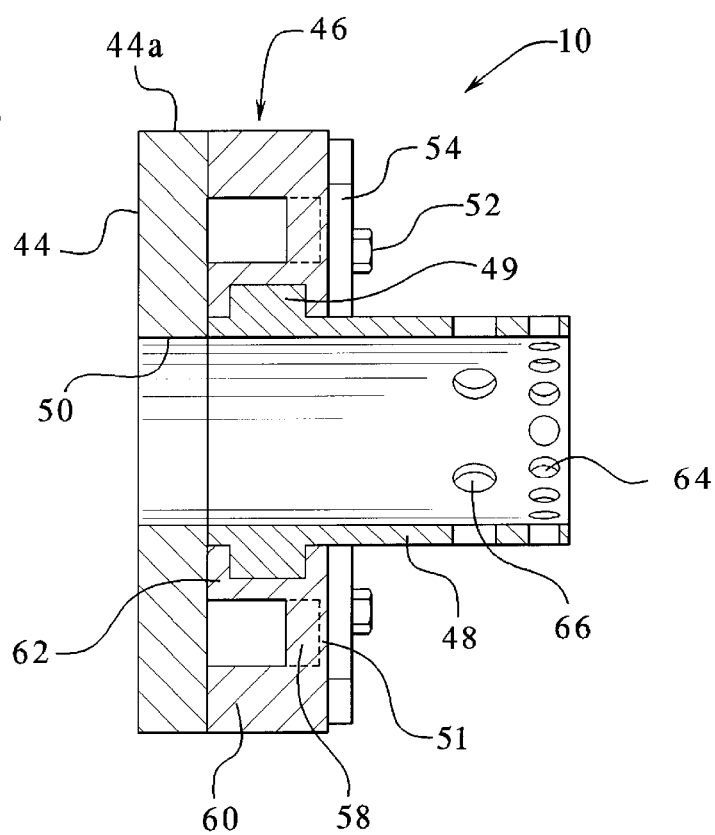
FIG. 4 is an axial sectional view of the low-profile tensioner of the invention.

The elastomeric collar is preferably made of a molded elastomeric material having excellent wear and memory properties, such as a molded polyurethane or other suitable plastic. However, it could be made of a suitable rubber if desired. During molding, the inner ring 62 of the collar is bonded to the steel sleeve 48 to effectively make the collar integral with the sleeve. A plurality of annularly arranged teeth 49, shown in phantom in FIG. 4, are provided on the outer surface of the sleeve in the area where the inner ring of the elastomeric collar is molded onto the sleeve to enhance the bonding of the collar to the sleeve. A pair of curved or semi-circular rigid bars 54, against which the heads of the bolts 52 engage, may be used to assist in connecting the elastomeric collar to the rigid collar and avoid any direct contact of the bolt heads against the plastic collar. The bars are preferably made of steel, but it is appreciated that they may be made of any suitable rigid material.

As shown in FIG. 4, the depth or thickness of the spokes 58 is less than the depth of or thickness of the rings, although the thickness of the spokes may vary depending on the torsion force desired to be generated on the scraper shaft. While the spokes are disposed adjacent one side edge of the rings, they may be disposed at any suitable location between the side edges of the rings. Further, adjacent spokes may be in one plane as shown or in staggered relation to each other. Preferably, the spokes extend radially in the same plane. A web 51 is provided on the outer radial face of the collar to close the spokes and the openings therebetween and prevent the entry of contaminants that could interfere with the function of the spokes.

The outer circumferential wall 60a of the outer ring 60 preferably aligns with the outer circumferential edge or wall 44a of the rigid collar 44. The inner ring 62 is bonded to the base of the sleeve 48 at the inner circumference of the ring. The sleeve 48, which is preferably steel, extends through the elastomeric collar 46 and receives the rotatable shaft 26 for free rotation about the shaft during the tensioning of the elastomeric collar.

A plurality of circumferentially spaced apart pin holes 64 provided at the sleeve's distal end serve to align with a locking bore or hole 65 on the rotatable shaft 26 to permit the locking pin 42 to be inserted and connect the elastomeric collar 46 to the rotational shaft 26 and apply a torsional force to the rotatable shaft 26 so as to produce a biasing force of the scraper blade 22 against the conveyer belt. Each pin hole is preferably diametrically opposed to a second pin hole so that the locking pin can extend through both pin holes and the locking hole to securely lock the sleeve and inner ring to the scraper shaft. Thus, when the elastomeric collar is loaded and the locking pin is inserted, the loading in the elastomeric collar will act to apply a torsional force to the sleeve and scraper shaft to resiliently bias the scraper blade against the conveyor belt.

In order to assist in the loading or tensioning of the elastomeric collar 46 and the setting of the locking pin 42 for connecting the elastomeric collar 46 to the rotatable shaft 26, the sleeve 48 has a plurality of wrench holes or openings 66 inward of the pin holes. A tensioner wrench 70 coacts with the wrench holes to rotate the sleeve for loading the elastomeric collar. While the row of pin holes 64 are directly adjacent the outer or distal end of the collar sleeve 48, and the row of wrench holes 66 are spaced inward of the row of pin holes, it should be appreciated that the positions of these holes may be reversed.

Figure 5:
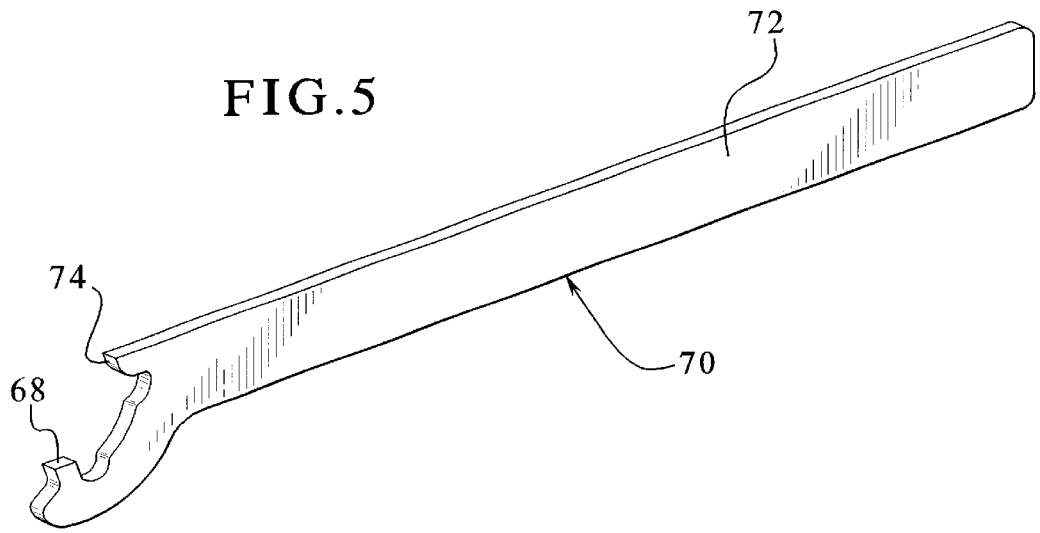
FIG. 5 is a perspective view of a tensioner wrench used to apply the torsion in the low-profile tensioner of the invention.

Once the tensioner is assembled and before the locking pin 42 is inserted, the rotatable shaft 26 is rotated in a clockwise direction until the tip or blade edge of the scraper blade 22 engages the surface 28 of the conveyor belt 12. The tensioner wrench 70 is then mounted on the collar sleeve 48 to rotate the inner ring 62 of the elastomeric collar 46 in a counterclockwise direction. The tensioner wrench 70, as shown in FIG. 5, includes an elongated lever arm 72 and a head including the prong 68 for insertion into one of the plurality of wrench holes 66 on the sleeve 48 and a bearing tab 74 for bearing on the outer surface of the sleeve 48. Once the prong 68 is inserted into a wrench hole 66, the lever arm 72 is rotated counterclockwise, whereupon the head of the lever arm 72 engages the sleeve 48 for rotating the inner ring 62 counterclockwise and loading the elastomeric collar 46. The sleeve 48 is rotated to apply the desired torsional force to the shaft, and the locking pin 42 is then inserted through a pair of opposed pin holes 64 on the sleeve 48 and through the shaft locking hole 65 on the rotatable shaft 26 to lock the elastomeric collar 46 to the rotatable shaft 26 and scraper blade 22. The torsion created on the shaft by the elastomeric collar will then act to apply a continuous clockwise torsion bias to the rotatable shaft, thereby maintaining the edge of the scraper blade in biased contact with the conveyor belt surface.

While the tensioner is shown at the right end of the scraper shaft, it is appreciated that it may be placed at the left end to apply the torsion force to the scraper shaft.

It will be understood that modifications and variations may be effected without departing from the scope of the novel concepts of the present invention, but it is understood that this application is limited only by the scope of the appended claims.

The invention is hereby claimed as follows:

1. A low-profile tensioner for a conveyor belt scraper engaging a conveyor belt on a conveyor carried by a support, wherein the conveyor belt scraper is mounted on a rotatable shaft that extends transversely of and in spaced relation to the surface of the conveyor belt and includes at least one locking hole, the low-profile tensioner comprising:

an elastomeric collar connected to the support, including an inner ring, an outer ring, and a force storing means connected between said rings, a rigid sleeve surrounding said rotatable shaft and extending through the inner ring of the elastomeric collar, said sleeve having a base end connected to the inner ring and a distal end having a plurality of pin holes for alignment with the at least one locking hole on the rotatable shaft; and a locking pin for insertion through at least one of the pin holes in the sleeve and the at least one locking hole in the rotatable shaft for connecting the rotatable shaft to the elastomeric collar and maintaining the belt scraper in biased contact with the belt.

2. The tensioner of claim 1, wherein the force storing means includes a plurality of spokes interconnected between the inner and outer rings.

3. The tensioner of claim 2, wherein the spokes are radially aligned with each other.

4. The tensioner of claim 1, which further includes a plurality of annularly spaced apart wrench holes on the sleeve, and a torsioning wrench coacting with the wrench holes to rotate the sleeve and load the elastomeric collar so as to apply a torsion force to the shaft and a biasing force to the scraper.

5. The tensioner of claim 2, wherein the tensioner further comprises means for covering the area between the spokes to prevent the introduction of contaminants.

6. The tensioner of claim 5, wherein the covering means comprises a web on the elastomeric collar that closes the spokes.

7. The tensionser or claim 1, wherein the elastomeric collar is polyurethane.

8. In combination with a conveyor belt scraper assembly including a scraper blade for engaging a conveyor belt, a shaft rotatably carried by a fixed frame, and means mounting the scraper blade on the shaft, the improvement in a tensioner for applying a force to the shaft to resiliently bias the blade against the belt, said tensioner comprising:

an elastomeric collar having an inner ring, an outer ring concentric to the inner ring, and force storing means interconnecting said rings, means connecting the outer ring to the fixed frame, and means for adjustably connecting the inner ring to the shaft to apply a torsion force to the shaft for resiliently biasing the blade against the belt.

9. The combination of claim 8, wherein said means connecting the outer ring to the fixed frame includes a rigid collar connected to the fixed frame, and means for connecting the outer ring to the rigid collar.

10. The combination of claim 8, wherein said means for adjustably connecting the inner ring to the shaft includes a rigid sleeve connected to the inner ring and received on the shaft, and means for adjustably connecting the sleeve to the shaft and loading the force storing means of the collar to apply a torsion force to the shaft.

11. The combination of claim 10, wherein the means for connecting the sleeve to the shaft includes pin holes on the sleeve, a locking hole on the shaft, and a pin insertable in said holes for connecting the sleeve to the shaft.

12. A conveyor belt scraper tensioner for resiliently biasing a scraper blade against a belt, wherein said blade is mounted on a shaft rotatably carried by opposed fixed frame members, said tensioner comprising:

an elastomeric collar having an inner ring, an outer ring concentrically spaced from the inner ring, and a plurality of spokes interconnecting said rings, means connecting the outer ring to one of the fixed frame members, and means for adjustably connecting the inner ring to the shaft to apply a torsion force to the shaft for resiliently biasing the blade against the belt.

13. The conveyor belt tensioner of claim 12, wherein said means connecting the outer ring to said one fixed frame member includes a rigid collar connected to the fixed frame, and means for connecting the outer ring to the rigid collar.

14. The conveyor belt tensioner of claim 12, wherein said means for adjustably connecting the inner ring to the shaft includes a rigid sleeve connected to the inner ring and received on the shaft, and means for adjustably connecting the sleeve to the shaft and loading the collar to apply a torsion force to the shaft.

15. The conveyor belt tensioner of claim 14, wherein the means for connecting the sleeve to the shaft includes pin holes on the sleeve, a locking hole on the shaft, and a pin insertable in said holes for connecting the sleeve to the shaft.

16. The conveyor belt tensioner of claim 15, which further includes wrench openings on said sleeve, and a wrench engaging one of the wrench holes and the sleeve to load the elastomeric collar before inserting the pin in said pin holes and the locking hole.

* * * * *